United States Patent [19]

Welsch

[11] 3,878,993

[45] Apr. 22, 1975

[54] METHOD FOR PRODUCING ALUMINUM PELLETS

[76] Inventor: Matthias Welsch, Dammstrasse, 415 Krefeld-Uerdingen, Germany

[22] Filed: Oct. 29, 1973

[21] Appl. No.: 410,634

Related U.S. Application Data

[63] Continuation of Ser. No. 209,391, Dec. 17, 1971, abandoned.

[30] Foreign Application Priority Data

Dec. 21, 1970 Germany.......................... 2062821

[52] U.S. Cl. .................. 241/3; 241/19; 241/27; 241/51; 241/DIG. 22
[51] Int. Cl. ... B02c 13/08; B02c 13/13; B02c 19/00
[58] Field of Search ............. 241/3, 18, 19, 24, 27, 241/49, 50, 51, 60, 73, 74, DIG. 22

[56] References Cited
UNITED STATES PATENTS

| 1,934,180 | 11/1933 | Fischer | 241/51 |
| 2,418,990 | 4/1947 | Sheldon | 241/51 |
| 2,726,045 | 12/1955 | Hinerfeld | 241/51 X |
| 3,462,088 | 8/1969 | Ionescu | 241/DIG. 22 |

*Primary Examiner*—Donald G. Kelly
*Attorney, Agent, or Firm*—Dorsey, Marquart, Windhorst, West & Halladay

[57] ABSTRACT

An improved method for producing aluminum pellets from aluminum chips including the steps of beating the aluminum chips together in a conventional sieve type hammer mill having a perforated drum and removing the resulting finely divided aluminum powder from the hammer mill continuously by means of passing an air current through the drum perforations.

6 Claims, No Drawings

METHOD FOR PRODUCING ALUMINUM PELLETS

This is a continuation, of application Ser. No. 209,391, filed Dec. 17, 1971 and now abandoned.

BACKGROUND OF THE INVENTION

The present invention relates generally to an improved method for producing aluminum pellets and more specifically to an improved method for producing aluminum pellets from aluminum chips which are primarily a waste product of aluminum works or fabricating plants. The method of the present invention may be carried out at a cost significantly less than previously known methods of producing aluminum pellets and in a manner resulting in the formation of an improved pellet.

Aluminum pellets are commonly used in the iron producing industry as alloying or deoxidizing agents. Because of their generally rounded form, they are particularly suited for being transported and conveyed from one location to another by way of chutes or sluice gates, since the pellets are not as easily obstructed as larger and more elongated chips of aluminum. A second application of aluminum pellets is in the preparation of various metals by the aluminothermal process, and a third application of aluminum pellets is for use as catalysts in various reactions. For purposes of the present discussion, the here termed aluminum pellets or aluminum grains should have a grain size of at least 1 millimeter but no greater than 10 millimeters.

Prior to the present invention, a great majority of the aluminum pellets were produced from known methods utilizing molten aluminum. Through the use of molten aluminum, it was known that aluminum pellets could be produced by the following methods:

1. By slowly stirring the solidifying aluminum;
2. By pouring the molten aluminum onto a screen through which the forming aluminum drops fall into a quenching medium; and
3. By atomizing the molten aluminum through means of a nozzle.

Although the above mentioned methods worked satisfactorily to produce aluminum pellets, each of these methods had the disadvantage that it required a liquid aluminum melt which, because of the high temperatures needed to obtain the melt, required costly equipment and significant heating costs. Additionally, aluminum pellets produced by the above mentioned molten aluminum methods form at the surface an oxide film which has a reaction-inhibiting effect when these aluminum pellets are put to use as oxidizing agents or catalysts or when reacting these pellets with other chemicals.

SUMMARY OF THE INVENTION

In contrast to the previously known methods of producing aluminum pellets, the present invention is an improved method for producing aluminum pellets which is less costly than the previously known methods of producing aluminum pellets from molten aluminum, which produces improved aluminum pellets for use as catalysts or in the iron producing industry as alloying or deoxidizing agents, and which reduces the danger of explosions commonly associated with finely divided aluminum particles or powder.

More specifically, the present invention includes the method of developing aluminum pellets from aluminum chips which are normally a waste product of aluminum works or aluminum fabricating plants and removing the resulting finely divided aluminum particles by means of an air current. Because the pellets are made from waste chips, the production costs of the pellets made according to the present invention are about one-third lower as compared to the production of pellets from molten aluminum. Further, in contrast to the production of pellets from molten aluminum, the shape of the aluminum pellets produced according to the present invention is fairly irregular and the surface is ragged thus causing a reaction-promoting effect when the pellet is used as a catalyst or as a component in other reactions. Finally, the method according to the present invention produces aluminum pellets which lack the reaction-inhibiting oxide film which is normally formed on the surface of aluminum pellets produced from molten aluminum. During the method of the present invention, the oxide film which normally forms on all aluminum pellets is rubbed off to a large extent, therefore reducing the reaction-inhibiting effect of the aluminum oxide film.

Accordingly, it is an object of the present invention to provide an improved method for producing aluminum pellets from aluminum chips rather than from molten aluminum.

Another object of the present invention is to provide an improved method for producing aluminum pellets which would reduce the cost when compared with known methods of producing aluminum pellets.

Another object of the present invention is to provide an improved method for producing aluminum pellets having physical characteristics resulting in a reaction-promoting effect, rather than a reaction-inhibiting effect.

A further object of the present invention is to provide an improved method for producing aluminum pellets by a non-thermo method, in which the danger of fine particles of aluminum exploding is prevented by removing these powdered aluminum particles by means of an air current.

These and other objects of the present invention will become apparent upon reference to the description of the preferred embodiment, and the appended claims.

DESCRIPTION OF THE PREFERRED EMBODIMENT

As mentioned above, the present invention is an improved method for producing aluminum pellets. Aluminum pellets may be defined for purposes of the present specification as pieces of aluminum having a grain size of at least 1 millimeter but not greater than 10 millimeters. More specifically, the present invention involves producing these aluminum pellets from aluminum chips by introducing aluminum chips into a sieve-type perforated drum of a mill, e.g., a hammer mill. During the formation of these pellets, however, there is necessarily produced also finely divided aluminum particles or powder which, if exposed to the proper conditions, have a tendency to explode. Because of this, the method of the present invention includes removing this finely divided aluminum powder continuously by means of passing air through the perforations in the drum of the hammer mill.

Generally, the hammer mill referred to above may be a conventional hammer mill having a rotatable shaft, a generally cylindrical housing or drum disposed about the shaft, and a plurality of perforations or holes in the drum. These perforations are about 1 millimeter and preferably 2 millimeters. Additionally, the apparatus designed to be used with the present method, includes a means for continuously passing air through the perforated openings of the drum or housing to remove the tiny aluminum powder particles which have been formed. Further, for better and prolonged durability of the drum, a second sturdier drum may be placed around the first drum with the second drum having perforations of about 2 millimeters in diameter but preferably having perforations of at least the same size or greater than the perforations of the inner drum.

Having now described generally the type of equipment which is intended to be used with the improved method of the present invention, the following is a more detailed description of the method of producing aluminum pellets from aluminum chips: First of all, aluminum chips which are normally waste products from aluminum works or fabricating plants are cleaned and dried if necessary and charged intermittently into the drum of the conventional hammer mill. The rotatable shaft is designed to rotate at speeds which are normal for the particular type of hammer mill being used. The drum of the hammer mill has perforations of about 1 millimeter and preferably 2 millimeters. As the hammer mill is started and the shaft begins to rotate, air is drawn off continuously from the internal drum zone through the perforations. This is necessary as it is known that particles of aluminum having a diameter less than approximately 0.05 millimeters has an increased tendency to explode. This danger of explosion is intensified as a result of the increased electrostatic charges caused by the rotating shaft and the moving aluminum particles. However, by evacuating the air from the drum, these finely divided aluminum particles may be discharged from the drum zone continuously. Additionally, the continuously withdrawn air creates a cooling effect to thus also decrease the chances of an explosion.

After removal from the drum, the finely divided aluminum powder, which is discharged along with the moving air stream, is precipitated outside the drum zone. This precipitated by-product may be put to further use as aluminum powder. Usually, the charged aluminum chips are beaten together in the drum to pellets having a sufficiently small size during a dwelling time in the drum of about 3 to 5 minutes. With this amount of time, pellets having a size between 2 and 10 millimeters may be formed. Of course, the size of the pellets is determined by the dimensions of the starting product and the characteristic data of the hammer mill. After expiration of the preselected dwelling time within the drum, the drum is charged with a second batch of chips and the above method steps are repeated.

The pellets produced by this method are suitable in the steel industry especially for use in sluice gates, e.g., in vacuum systems, as they are not easily obstructed. The above described method also has proved satisfactory for chips from malleable aluminum alloys and also in the processing of chips of the eutectic Al-Si alloy.

Although the above description of the improved method of the present invention has been quite specific, it is contemplated that changes could be made from this detailed description without deviating from the spirit of the present invention. Consequently, the scope of the present invention should not be limited by the specification but should rather be dictated by the appended claims.

I claim:

1. An improved batch process for transforming aluminum chips into aluminum pellets of a desired minimum and maximum size comprising the steps of:
   introducing aluminum chips of a preselected size into a perforated drum of a hammer mill;
   actuating the hammer mill and thereby beating the aluminum chips together and compacting said chips in the hammer mill for a dwell time sufficient to transform such chips into irregular-shaped, rough-surfaced pellets as a main product, said pellets having a diameter in the range from 1-10 millimeters, the maximum diameter being determined by the size of the aluminum chip and the dwell time and the minimum diameter being determined by the size of the perforations in said drum;
   continuously discharging any resulting finely divided aluminum powder and pellets having a diameter less than that desired from the drum as a by-product; and
   removing the formed pellets from said drum at the end of such dwell time.

2. The improved method of claim 1 including beating the aluminum chips together in the hammer mill for at least 3 minutes but not longer than 5 minutes.

3. The improved method of claim 1 including continuously discharging the resulting finely divided aluminum powder through the perforations in the perforated drum.

4. The improved method of claim 3 including continuously discharging the resulting finely divided aluminum powder through the drum perforations by means of an air current.

5. The improved method of claim 4 including beating the aluminum chips together in the hammer mill for at least 3 minutes but not longer than 5 minutes.

6. The improved method of claim 1 including intermittently introducing aluminum chips into a perforated drum of a hammer mill.

* * * * *